US012174863B2

(12) United States Patent
Weinstein

(10) Patent No.: US 12,174,863 B2
(45) Date of Patent: Dec. 24, 2024

(54) STRUCTURING OF UNSTRUCTURED WEB POSTING

(71) Applicant: Steady Platform LLC, Atlanta, GA (US)

(72) Inventor: Lior Weinstein, Atlanta, GA (US)

(73) Assignee: STEADY PLATFORM, LLC, Atlanta, GA (US)

(*) Notice: Subject to any disclaimer, the term of this patent is extended or adjusted under 35 U.S.C. 154(b) by 77 days.

(21) Appl. No.: 17/315,418

(22) Filed: May 10, 2021

(65) Prior Publication Data

US 2021/0263958 A1 Aug. 26, 2021

Related U.S. Application Data

(63) Continuation of application No. 16/114,433, filed on Aug. 28, 2018, now Pat. No. 11,100,143.

(60) Provisional application No. 62/700,412, filed on Jul. 19, 2018.

(51) Int. Cl.
| | |
|---|---|
| *G06F 16/00* | (2019.01) |
| *G06F 16/31* | (2019.01) |
| *G06F 16/35* | (2019.01) |
| *G06F 16/95* | (2019.01) |
| *G06Q 10/0631* | (2023.01) |
| *H04L 9/40* | (2022.01) |

(52) U.S. Cl.
CPC .......... *G06F 16/313* (2019.01); *G06F 16/353* (2019.01); *G06F 16/95* (2019.01); *G06Q 10/063112* (2013.01); *H04L 63/10* (2013.01)

(58) Field of Classification Search
CPC ...... G06F 16/313; G06F 16/353; G06F 16/95; G06F 16/9538; G06Q 10/063112; H04L 63/10
See application file for complete search history.

(56) References Cited

U.S. PATENT DOCUMENTS

| | | | | |
|---|---|---|---|---|
| 10,438,264 | B1* | 10/2019 | Viswanathan | G06N 5/04 |
| 2014/0074738 | A1 | 3/2014 | Thankappan et al. | |
| 2014/0372861 | A1* | 12/2014 | Lawless | G06F 40/143 |
| | | | | 715/224 |
| 2015/0378975 | A1* | 12/2015 | Wu | G06Q 30/06 |
| | | | | 715/226 |
| 2016/0140254 | A1* | 5/2016 | Yan | G06F 16/9038 |
| | | | | 715/771 |
| 2016/0314200 | A1 | 10/2016 | Markman et al. | |
| 2017/0243163 | A1* | 8/2017 | Vootkur | G06Q 10/1053 |
| 2019/0095868 | A1* | 3/2019 | Zhang | G06Q 50/01 |

(Continued)

*Primary Examiner* — Paul Kim
(74) *Attorney, Agent, or Firm* — Buckley, Maschoff & Talwalkar LLC

(57) ABSTRACT

Provided are systems and methods for improving understanding and access of unstructured text-based web postings. In one example, a method may include receiving a web posting comprising unstructured text, identifying one or more explicit attributes of an activity based on text expressly recited in the unstructured text, determining one or more hidden attributes of the activity not recited in the unstructured text based on a pattern of words included in the unstructured text, converting the unstructured text into a structured object format comprising the one or more explicit attributes and the one or more determined hidden attributes, and outputting the web posting with the structured object format for display via a user interface.

17 Claims, 8 Drawing Sheets

(56) References Cited

U.S. PATENT DOCUMENTS

2019/0095869 A1 3/2019 Zhang et al.
2019/0370402 A1 12/2019 Yang et al.

* cited by examiner (Arrange)

STRUCTURING OF UNSTRUCTURED WEB POSTING

CROSS-REFERENCE TO RELATED APPLICATION(S)

This application is a continuation of U.S. Ser. No. 16/114,433, filed on Aug. 28, 2018, in the United States Patent and Trademark Office, which claims the benefit of U.S. Provisional Patent Application No. 62/700,412, filed on Jul. 19, 2018, in the United States Patent and Trademark Office, the entire disclosures of which are incorporated by reference herein for all purposes.

BACKGROUND

In a shared economy, also referred to as a gig economy, organizations and individuals may contract with independent workers for short-term engagements, longer-term temporary engagements, full-time positions, and the like. The trend towards a gig economy is well underway. A recent study predicted that by 2020, approximately forty percent (40%) of American workers will have some form of earnings as an independent contractor. A contributing factor for this shift is due to the increasing mobility of jobs. In many cases, job performance and its location are decoupled allowing for jobs to be performed remotely or at multiple locations.

In order to find independent workers, organizations and individuals that are established as a gig economy rely on social networking and Internet-based sites to attract and identify new employees, and also to keep current employees informed of various company-related information. Often, a job is posted online in the form of a text-based description providing information about the job, the employer, the compensation, and the like. Through these websites, workers can select and apply for job opportunities and other projects around the world, while employers can select the best individuals for specific task from a larger pool than that available in any given area.

However, job postings are not posted to a central location and do not have a common structural format. Instead, job postings are found on numerous websites (job boards, social networks, etc.) in differing formats. Often, a user must visit multiple sites and look through lists of search results to examine a broad range of opportunities. Furthermore, job postings have widely varying information and often include unnecessary information and/or a lack of adequate details about the job posting, the employer, the compensation, the necessary skill, and the like. In some cases, the job posting may even be scam or other attempt to defraud. Accordingly, what is needed is an improved way for providing users with optimized job-related information in a rich user convenient format.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
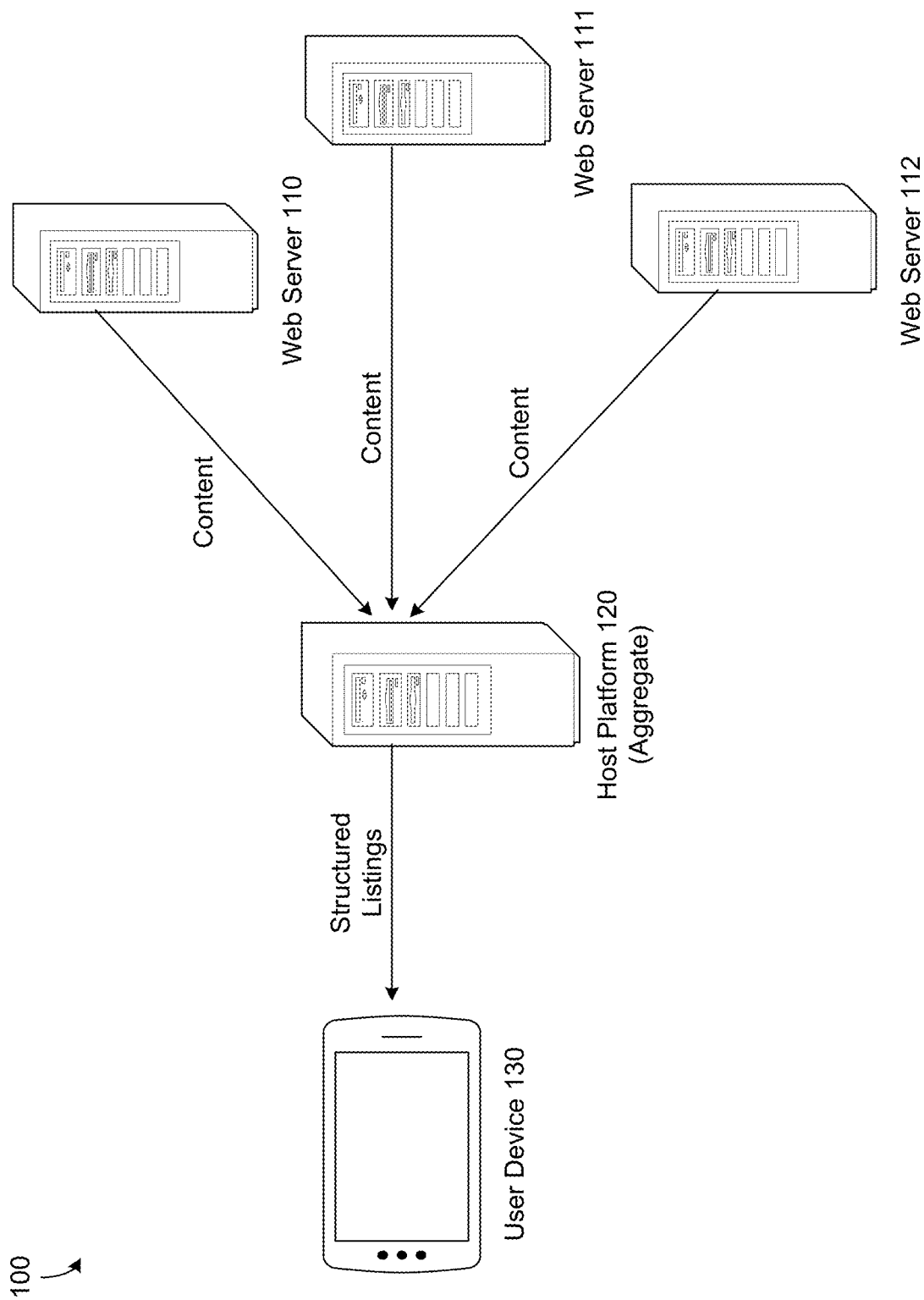
FIG. 1 is a diagram illustrating a system for acquiring web data from a plurality of websites in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

Job postings and other web listings are not required to conform to a specific format. As a result, a posting for a job opportunity can include a wide variety of information making it difficult for a potential employee/user to identify pertinent information when reading the job posting. In many cases, the job positing may only provide limited information about the job while leaving out information that is of importance to many potential employees such as educational/training requirements, compensation, whether the job is short-term or long-term, the likelihood that such job will lead to more work opportunities, and the like. Furthermore, the lack of structure in the job posting requires a user to fully read through the job posting in an attempt to identify information of interest. As a result, it can take a person significant amounts of time to read through and identify postings that are relevant to their particular interests. Furthermore, a user must often guess or take a chance that such a posting is not a scam (fraud) of some kind.

The example embodiments overcome these drawbacks by automating the process of normalizing job postings into a structured format. Moreover the system can enhance job postings by determining implicit (i.e., hidden or otherwise omitted) attributes of a web posting that are not recited within the text of the posting. The hidden attributes may be implied based on historical data, machine learning, patterns of words within the text, and the like. The unstructured format of a job posting can be converted into a structured format which includes a listing of details with fields, values, and the like, which provide a user with a convenient look and feel. For example, the structured posting may be formatted into a convenient user-friendly post which identifies both express and implied attributes of the job posting together in a format that does not require the user to read the unstructured text to understand information of interest. As another example, the structured attributes may be stored within a data object which is aggregated with other data objects of attributes which have been converted from other job postings. In this case, the job postings can be analyzed as a group (e.g., via an index, etc.) to determined and provide additional information that might be of interest to a potential employee such as amount of average compensation, hours need to make X amount of dollars, location-based statistics and information, job-type related statistics and information, and the like.

In some embodiments, the system herein can also identify whether a web posting is an irrelevant web posting based on various classification attributes within the web posting. An irrelevant web posting may be a posting that is directed towards a fake/false opportunity, a risky opportunity (e.g., significant time expended or materials purchased upfront without pay, etc.), an unproductive opportunity (e.g., very little income earning potential, etc.), and the like. False postings may omit certain attributes or include duplicate attributes that taken alone or in combination may be an indicator of a scam. For example, when a job description does not provide adequate details, when a compensation level is higher than average for a particular job, when a duplicate phone number is detected, and the like, can be identified by the system and used to determine whether the posting is actually a scam.

FIG. 1 illustrates a network system 100 for acquiring web data from a plurality of websites in accordance with an example embodiment. Referring to FIG. 1, the system 100 includes a plurality of web servers 110, 111, and 112 which each host respective websites that have job postings (or other postings/listings). According to various aspects, a host platform 120 may scrape or otherwise acquire web-based data from the web servers 110, 111, and 112. The host platform 120 may correspond to a search engine or aggregation engine in which search results are aggregated from multiple websites. The host platform 120 may include a web server, a cloud platform, a database, and the like.

The web-based data stored by the web servers 110, 111, and 112 may be automatically scraped on a periodic or regular basis (e.g., once a day, etc.), randomly, in response to a condition, and the like. The job postings may include information in text-based format such as a string of characters and numbers. The text-based data may be unstructured in that it does not require a common format. Because of the unstructured nature of the job postings, the postings may include different information while omitting information that is necessary or of interest to a user. In most cases, the information contained in a job posting is left to the desire of a job poster.

According to various embodiments, the host platform 120 may acquire unstructured web postings and create structured postings based on the unstructured data. In some embodiments, the structured postings/data may be output to a user device 130 via a web browser or other search software program. The results may be provided in response to a query or other input entered via a search engine. The results of the query may be structured into a common format such that a user can quickly and easily identify information that is of interest. Furthermore, when information is missing or otherwise omitted or hidden from a job posting, the host platform 120 may determine one or more implicit attributes of the job. For example, the host platform 120 may infer or otherwise determine whether a special training is required for the job, whether resources are needed by the employee (tools, car, license, etc.), an amount of pay needed, whether the job is recurring or one-time, and the like.

The example embodiments provide the ability to capture unstructured text of any kind (not just web postings), and extrapolate a job-based opportunity therefrom. Examples of websites with unstructured data postings include, but are not limited to, Craigslist, Indeed, Monster.com, etc.

An example of an unstructured data post is, "I need a mover today for 1 pm. $80. Thanks, Dan. (203) 456-2398." When a person looks at this posting they know usually if this is fake or not. They also know whether this is a long-term vs. one-time opportunity and whether there is growth potential with a potential. Humans are also able to understand the timing (1 pm today) but if is currently 2 pm then it can be deduced that the offer is already taken. Also, no need to respond if after 1 pm.

Another example of an unstructured data post is, "I need my engine replaced on my 2000 Impala. Want to work on it this weekend? Thanks, Jon (203) 812-3456." In this example, the activity is implicit (i.e., engine replacement/transmission replacement) which means a car mechanic is needed. Furthermore, there is an implicit offer to pay. No one expects this for free. The price may be implicit based on standard rate in the industry (less than dealership though, etc.). This is a one time offer (implicit) and is to be performed this weekend (implicit). Another implicit attribute is that it would be useful to bring a toolset to the job and may even be required for a car mechanic. When a human reads this web post they read all of this information and it goes through their minds to make an informed understanding about information not expressly listed in the web posting. However, a website scraper typically only looks for keywords/matches to a specific query.

The example embodiments may read the unstructured web posting, classify an activity of the web posting into a type of job, classify it into a frequency (one time, periodic, long term, etc.), and identify various attributes about the job both implicit and explicit. The system here is capable of reading a web posting and deducing (e.g., labeling, classifying, etc.) information about the job like a human would. The more job posts that are analyzed, the better the machine algorithm learns and creates more accurate classifications. The machine learning can be used to approximate factors that are not expressly listed within the web posting but that a human mind would naturally understand. In other words, the system can figure out what is meant rather than a black/white description of what is going on. For approximate results, the system may also provide a score of how accurate the prediction is.

After the job posting is classified it can be output to a website forum in a clear and understandable format that is easier for a user to understand. Another option is to sort the data by normalizing and indexing the data to provide a list of job postings that can be analyzed by various analytic applications to determine information about job opportunities in an aggregate/group structure. For example, the system may provide users with similar opportunities in their field while if a posting is not in their field the data may be hidden. The data is available to the user in a better format that is easier for the user to understand.

Figure 2:
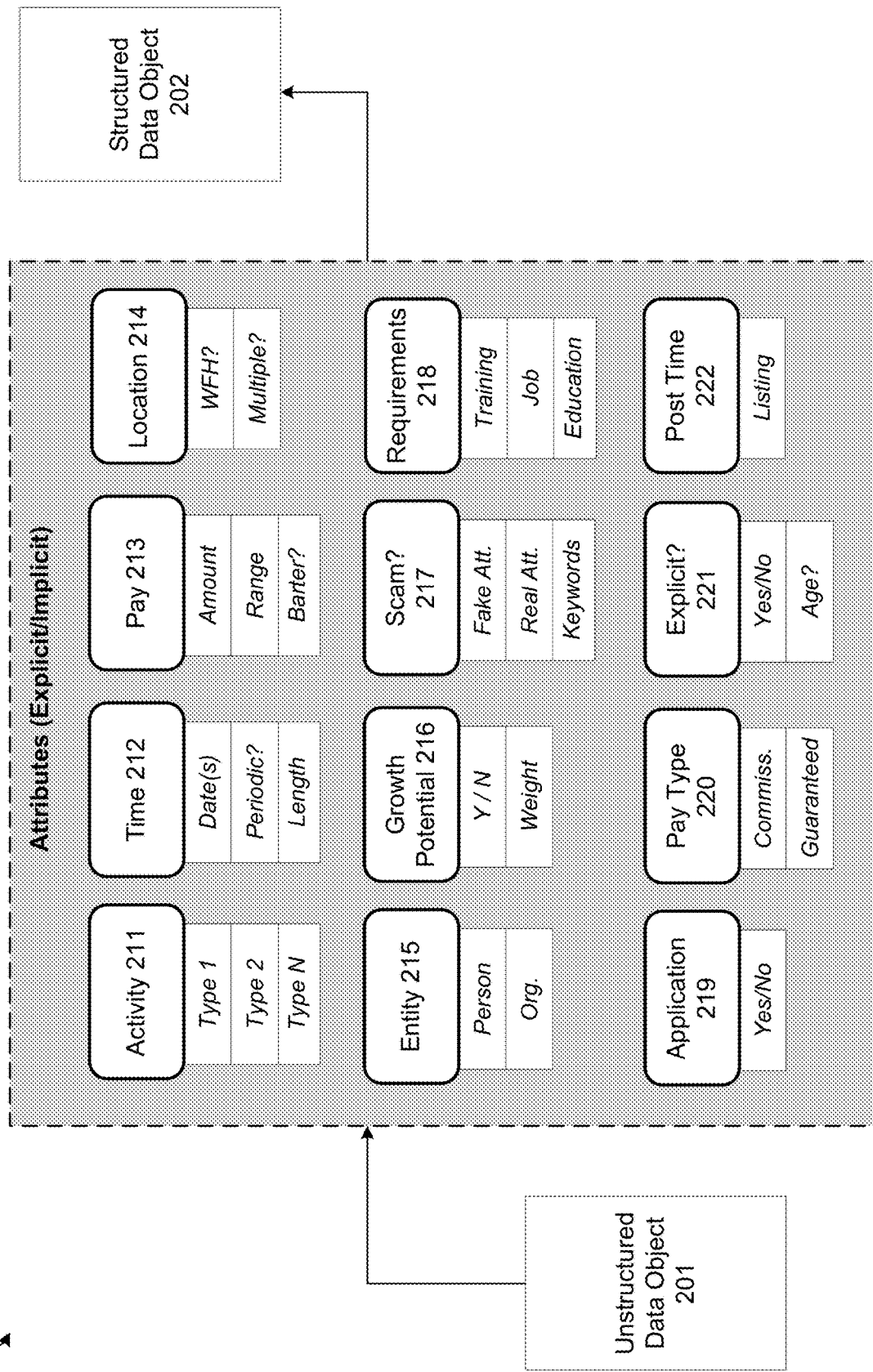
FIG. 2 is a diagram illustrating examples of classification attributes that can be used for converting an unstructured data object in accordance with an example embodiment.

FIG. 2 illustrates examples of classification attributes 211-222 that can be used for converting an unstructured data object 201 into a structured data object 202, in accordance with an example embodiment. The system may read a piece of text/alphanumeric data from a web posting, run it through various trained models to score the job posting as a particular type of job opportunity having various attributes. The models may include a machine learning model that can read unstructured text from job postings as input, classify the job posting, and output a structured version of the attributes in a format that is more convenient and with relevant data. The system may extract causally significant decision factors for someone to choose an opportunity such as a job.

Listed below are various classifiers (e.g., attributes) that can be used to label/classify a job opportunity into a particular type, and identify additional attributes (hidden attributes) of the job posting. The classifiers include, but are not limited to an activity type 211, a work time 212, a range of pay 213, a location 214, an employer entity 215 (company vs. individual), growth potential 216, scam detection 217, requirements 218, application process 219, guaranteed pay 220, explicit categorization 221, posted time 222, and the like. It should be appreciated that these classifiers 211-222 are merely for purposes of example and are not meant to limit the amount or type of classifiers that can be used. Also, any of these classifiers may be hidden and may be determined from patterns of words within the unstructured text. In some cases, the hidden attributes may be determined based on explicit attributes which have been identified from the unstructured text.

As an example, the activity 211 may indicate the actual work to be done. The activity 211 may indicate whether it is a position description or actual activity description such as a moving sales representative. For example, a posting such as "Need painting done. Have the primer and paint but the person doing the work needs to have the materials to paint." Here, the system would determine the activity to be painting. Some of the most important fake/non-fake attributes is the existence of an activity. Meaning if you parse the post and you can't derive an activity, it's a signal it is 'fake' web post. Furthermore, although not explicitly mentioned in the post, the system can infer from the explicitly identified activity (i.e., painting) that the person will need a paint brush, a roller, a spray gun, tarps, etc., for the activity. The inferred information may be the resource attributes which are hidden in the unstructured text (i.e., omitted, missing, etc.). An example of a work time 212 is a point in time at which the job opportunity is relevant. In other words, what day, time, date range, part-time, regular, etc., can be deduced by the system. This attribute may be explicit or implicit. An example of range of pay 213 is an amount of money or other compensation from a job opportunity. Here, the range of pay may be explicit or it may be implicit and determined based on a duration in the post, a rate of pay for other similar activities, or the like. In some cases, a range of price values may be provided instead of a specific price for compensation. The location 214 may be the geographic location at which the job is to be performed, or it may indicate cyber work, work from home, mobile/driving, or the like. The entity 215 may indicate whether the job is posted by a person or an organization such as a company.

Other examples of classifiers include growth potential 216 which indicates whether the job opportunity might qualify the user for additional opportunities of work. For example, if the job is for a specific person, you gain experience, but the user can't use it for references or you can't expect to get more work from that person as opposed to a company.

Another classifier is the relevance identification 217 which can determine whether the job posting is relevant. Here the relevancy may be based on fraud, risk, appropriateness of the opportunity, and the like. The system may map attributes as relevant or irrelevant based on one or more machine learning algorithms. When an irrelevant opportunity is detected, the job posting can be flagged with a warning and the user that posted the job can be prevented or blocked from accessing the website.

Other examples of classifiers include requirements 218 which identify skills or other resources needed (if any) for a job. Requirements may include skills required, education level, job experience, a car, personal property, real property, tools, and other materials and resources. Another classifier is an application process 219 which may indicate whether the user needs to fill-out an application to apply. Further, guaranteed pay for effort 220 or pay type indicates whether the job is a commission only/performance based opportunity or whether the user is guaranteed to receive a wage (daily, hourly, weekly, etc.). Another example classifier is explicit categorization 221. In this classification, some jobs, although they are valid, are adult-oriented. Like female nude models for art classes. The system may classify the jobs if they are 'Explicit' in category. Another classifier is posting time 222 which identifies when was the listing was published (activated) on the website.

Figure 3A:
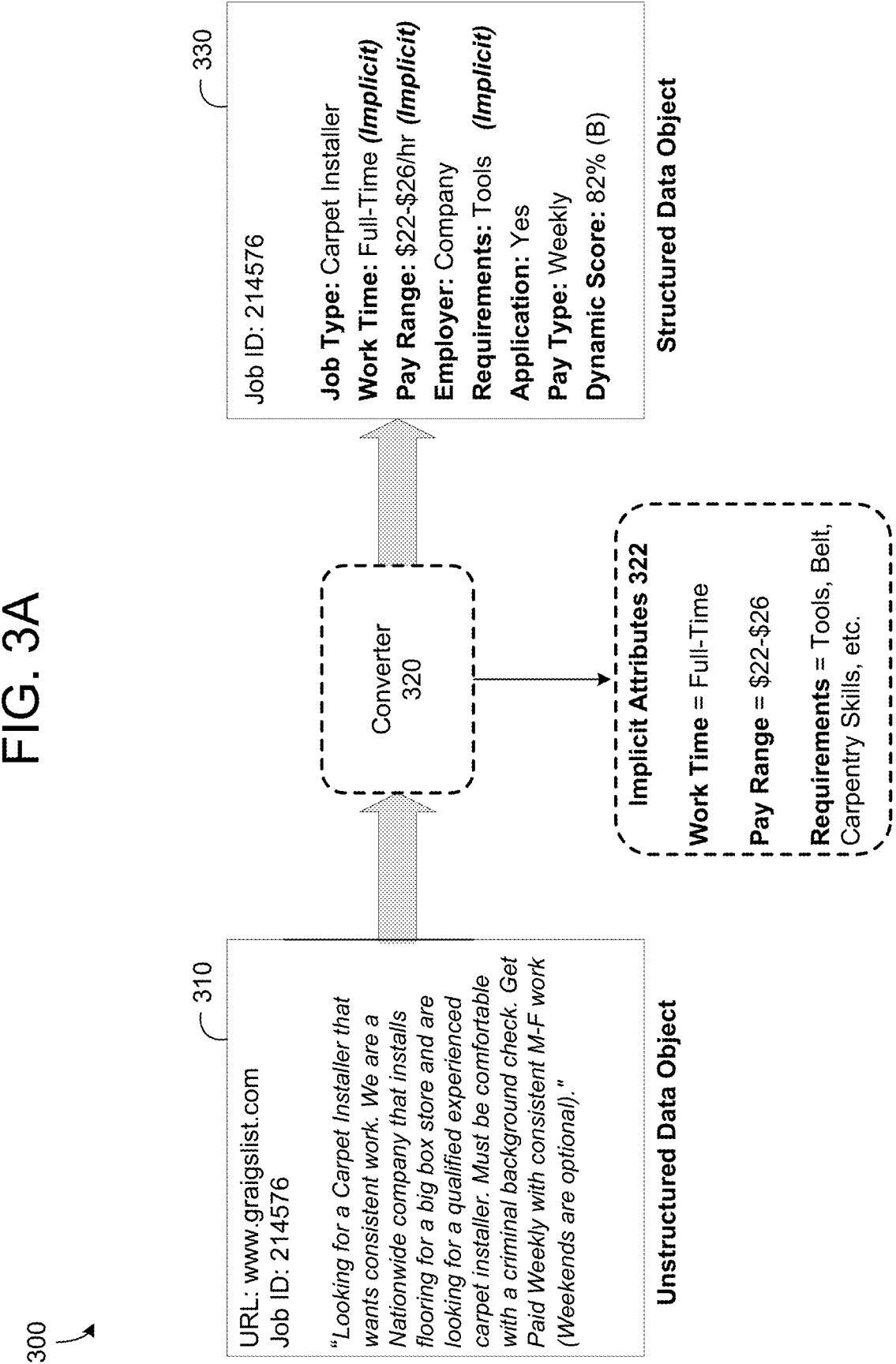
FIG. 3A is a diagram illustrating a process of transforming an unstructured web listing into a structured web listing in accordance with an example embodiment.
Figure 3B:
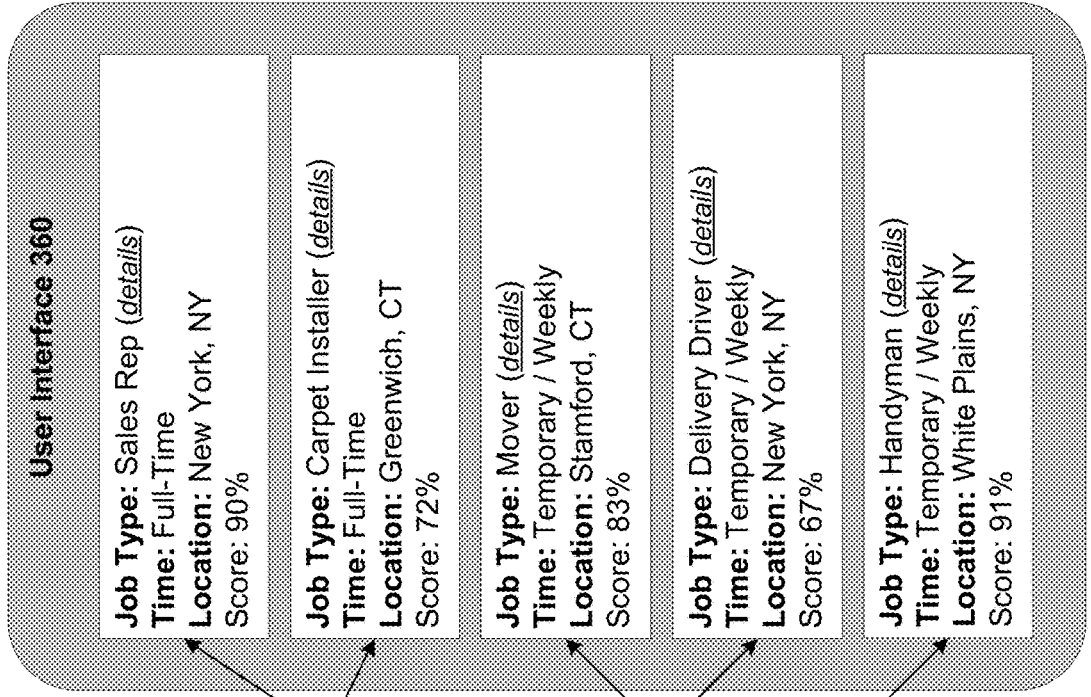
FIG. 3B is a diagram illustrating a user interface arranging transformed web listings in accordance with an example embodiment.

FIG. 3A illustrates a process 300 of transforming an unstructured web listing 310 into a structured web listing 330 in accordance with an example embodiment, and FIG. 3B illustrates a user interface 360 in which transformed web listings are arranged based on user preferences in accordance with an example embodiment. Referring to FIG. 3A, a converter software program 320 may be used to read text, numbers, symbols, and the like, from the content of unstructured data object 310. In this example, the text includes a string which states, "Looking for a Carpet Installer that wants consistent work. We are a Nationwide company that installs flooring for a big box store and are looking for a qualified experienced carpet installer. Must be comfortable with a criminal background check. Get Paid Weekly with consistent M-F work (Weekends are optional)."

Based on the text and/or numerical data included within the unstructured web listing 310, the converter 320 may identify explicit attributes such as job type, employer type, pay type, and application. In addition, the converter 320 may also determine one or more implicit attributes 322 based on the unstructured web listing 310. The implicit attributes 322 may be deduced based on historical data which has been learned from through machine learning, and text and/or numerical attributes of the unstructured web listing 310. For example, the text-based data may be used to deduce or otherwise infer any of the classifiers 211-222 shown in the example of FIG. 2. Here, the implicit attributes 322 include a work time (full-time), a pay range ($22-$26), and requirements needed (tools, belt, carpentry skills, etc.) The machine learning may identify a word or a pattern of words within the unstructured text which can be used to "imply" other attributes that are not recited in the text. Accordingly, in the example of FIG. 3A, the implicit attributes 322 may be determined from patterns and from historical data.

Furthermore, the converter 320 may generate a structured web listing 330 which include explicit attributes taken from the unstructured web listing 310 and any implicit attributes 322 which are gleaned or otherwise deduced from the unstructured web listing 310 but which are not specifically listed in the unstructured web listing 310. In this case, the implicit attributes are newly added text values that are not present in the original unstructured web listing 310 and which enhance the understanding of the user when reading the structured web listing 330.

In the example of FIG. 3B, a group of transformed (structured) web listings 350 are arranged within a user interface 360 based on what is likely to be most appealing to a user. In addition to displaying a snapshot of the attributes of a job associated with each listing, each web posting may also include a confidence score 352 which indicates how confident the converter 320 is that the job details are accurate in the structured web listing. As another example, the transformed web listings 350 may be arranged based on one or more other factors such as the confidence score of the accuracy of the web listing, a geographic location, a compensation amount, or the like.

The examples of FIGS. 3A and 3B are related to an unstructured data object such as a web listing being converted into a structured data object having implicit and explicit attributes which can be used for indexing and further analytics, a more structured web listing, and the like. As another example, the converter 320 may perform a similar conversion on a structured web listing. For example, a web listing from a website may have a pre-existing structured information such as predefined attributes. However, in order to normalize the structured web listing with other converted unstructured web listings, the system may convert the structured web listing into a differently structured (modified) web listing or even index of features. Here, the converter 320 may use the same technology to add (imply or otherwise infer) more attributes that are decision-critical or decision-useful for the user in the context of applying for the opportunity. Also, the converter 320 may identify implicit attributes that can be used to enhance an indexing of the structured web listing for further analysis.

According to various embodiments, each attribute such as classifiers 211-222 shown in FIG. 2, may be identified with a separate and independent machine algorithm/analyzer. However, the analyzers may be chained together in that one analyzer may use an output from another analyzer to identify attributes. For example, one of the signals that a posting may be a fraud, may be a lack of an activity. Therefore, the output of the activity analyzer may be an input for the fraud analyzer. The analyzers may work in parallel and continue to work until all of the analyzers each finish. The analyzers may look for patterns of different words, not just keywords. The patterns may be compared with a database of patterns that have been developed over many iterations of a learning. If a posting states, "I need my face painted", the pattern here is face painted, not just painted. In this way, the system identifies that a face painter is needed rather than a house painter, etc. The algorithm may look for patterns of words. As another example, the posting may say "I need my transmission replaced" where the implicit attribute that is determined is the user needs to have training/experience as a car mechanic.

After the attribute analyzers have all finished, a structured format is generated for the job posting which includes the identified attributes. The output attributes may be stored as an object in a database such as a JavaScript Object Notation (JSON) object, or the like. By storing the output attributes as an object, the system can store each job posting in a common format even when a different number of attributes are identified among job postings. The databased object may also include an ID of the web posting, a website where the posting is from, and the like. For example, a job posting where 10 attributes are identified and a job posting where 5 attributes are identified may both be stored in a common JSON object, etc. The object data may be used in an index, where it can be quickly queried by another software application such as an analytic, etc. to analyze the data objects in a large group. As another example, the object data may be converted into a web posting have a normalized structure. A user may search through normalized job postings by providing context such as time, place, etc., where they would like to search. Based on the context, the system can provide the user with the best opportunities that satisfy the time and location submitted by the user.

In some embodiments, relevancy may be used by the system to identify web listings that are of interest to a user. For example, the system may perform recommendations to the user for a grouping of relevant job opportunities that are identified by the system and extracted from websites. Here, the system may identify unstructured or structured job listings that are relevant to a user based on preferences, skills, time availability, property, education, training, and the like, of the user, and provide the recommended web listings to the user via a user interface. When performing the recommendation, the system may also convert the web listings from unstructured data objects (web listings) into a structured format that enables the user to quickly and commonly ascertain the details of each job listing. In this way, the system can normalize the details of the job opportunities and even determined implicit attributes of the job opportunities when not explicitly mentioned in the details thereby improving user convenience.

Figure 4:
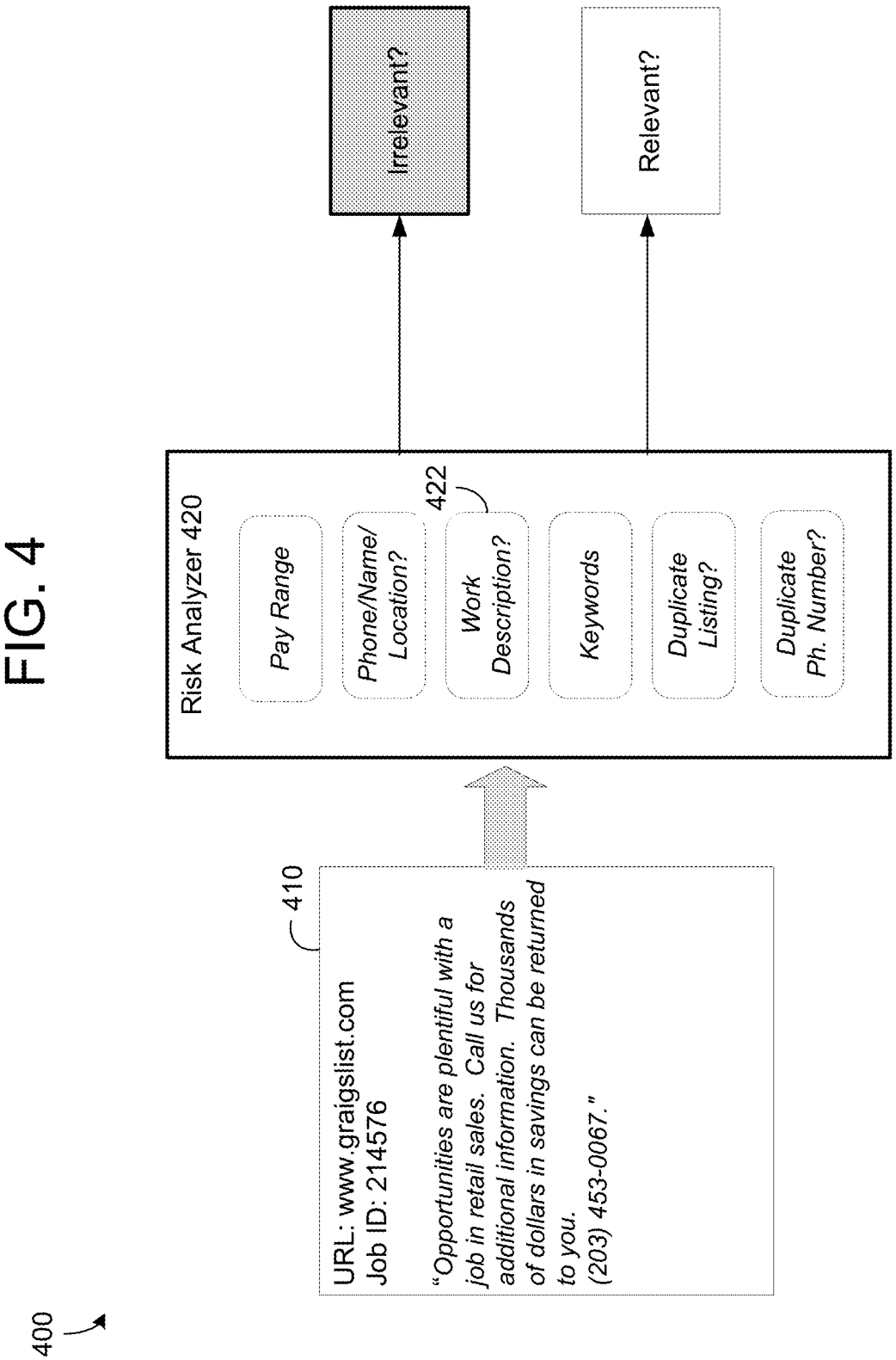
FIG. 4 is a diagram illustrating a process of detecting an irrelevant web listing in accordance with an example embodiment.

FIG. 4 illustrates a process 400 of detecting an irrelevant web listing in accordance with an example embodiment. For example, the converter 320 shown in FIG. 3A, the host platform 120 shown in FIG. 1, a combination thereof, or the like, may determine whether or not an unstructured web posting 410 corresponds to an irrelevant job opportunity posting or a real posting based on machine learning. In the example of FIG. 4, the web listing 410 is determined to be an irrelevant web listing based on various attributes. In particular, a risk analyzer 420 which may be part of the converter 320 or a stand-alone program, may use various risk attributes 422 to determine if a web listing is associated with an irrelevant activity such as a job, task, or other high-risk opportunity. Examples of risk attributes 422 include a pay range, whether the listing includes a phone number, a name, a location where the work is to be performed, a work description, keywords, whether the listing is a duplicate, whether the phone number is a duplicate, and the like. The risk attributes 422 may be predefined based on attributes that help identify fraud, risk, unproductivity, and the like.

The risk analyzer 420 may be a machine learning program that identifies opportunities that are not worth the user's time and therefore irrelevant. These opportunities may be irrelevant for any of multiple reasons including a scam/fraud, a risk (e.g., travel time, upfront costs, etc.), a low profitability (e.g., commission-based, etc.), and the like. The risk attributes 422 can be used to identify a company name and the risk analyzer 420 may determine whether the company is a non-reputable company based on user reviews, web browser searching, etc., which may indicate a negative experience. As another example, the risk analyzer 420 may detect if a user may be required to expend significant costs, materials, time, etc. For example, the job opportunity may require significant travel time for little compensation or commission-based pay without any guarantees. Also, trust elements may be identified within the posting by the risk analyzer 420 and further analyzed to determine whether the posting is fraudulent. Trust elements include company names, names of people, phone numbers, user reviews, has this phone number been used in spam-posts or other risky posts, is the posting a duplicate (e.g., previously posted in NYC and now being posted in Atlanta, etc.) and the like. The irrelevant determination may indicate that it is likely not worth the user's time for one of multiple reasons such as fraud, risk, expense, and the like.

In the example of FIG. 4, the web listing 410 does not include a pay range but mentions that thousands of dollars can be saved. This amount seems excessive. In addition, the web listing 410 does not include a name or a location of where the work is to be performed. In addition, the work description does not provide much detail on the job duties. In this example, the risk analyzer 420 determines that the web posting 410 is a fraudulent posting based on various classifiers mentioned above. For example, the risk analyzer 420 may determine that a web posting is fake if the posting does not have a reasonable pay range, if the listing does not have each of a phone number+location+name of person, if the listing doesn't describe the actual work activity but rather just the potential compensation, if the listing has various keywords such as partner, consultant, enrollment, etc., a duplicate phone number as another listing, a duplicate listing, and the like. These factors may be weighted and given various consideration.

As another example, if a web posting requires a user to perform a significant amount of work upfront or purchase materials/tools without a guaranteed compensation, the risk analyzer 420 may determine the web posting is an irrelevant web posting. As another example, if the web posting is poorly described the risk analyzer 420 may determine the web posting is likely fraudulent. Here, the risk analyzer 420 may look for patterns of words within an unstructured text to identify relevancy of the posting. If a posting does not include a description of an activity to be performed, the posting is likely to be fake. Therefore, the risk analyzer 420 may identify whether an activity is fully described within the unstructured text when determining a relevancy of the posting.

Figure 5:
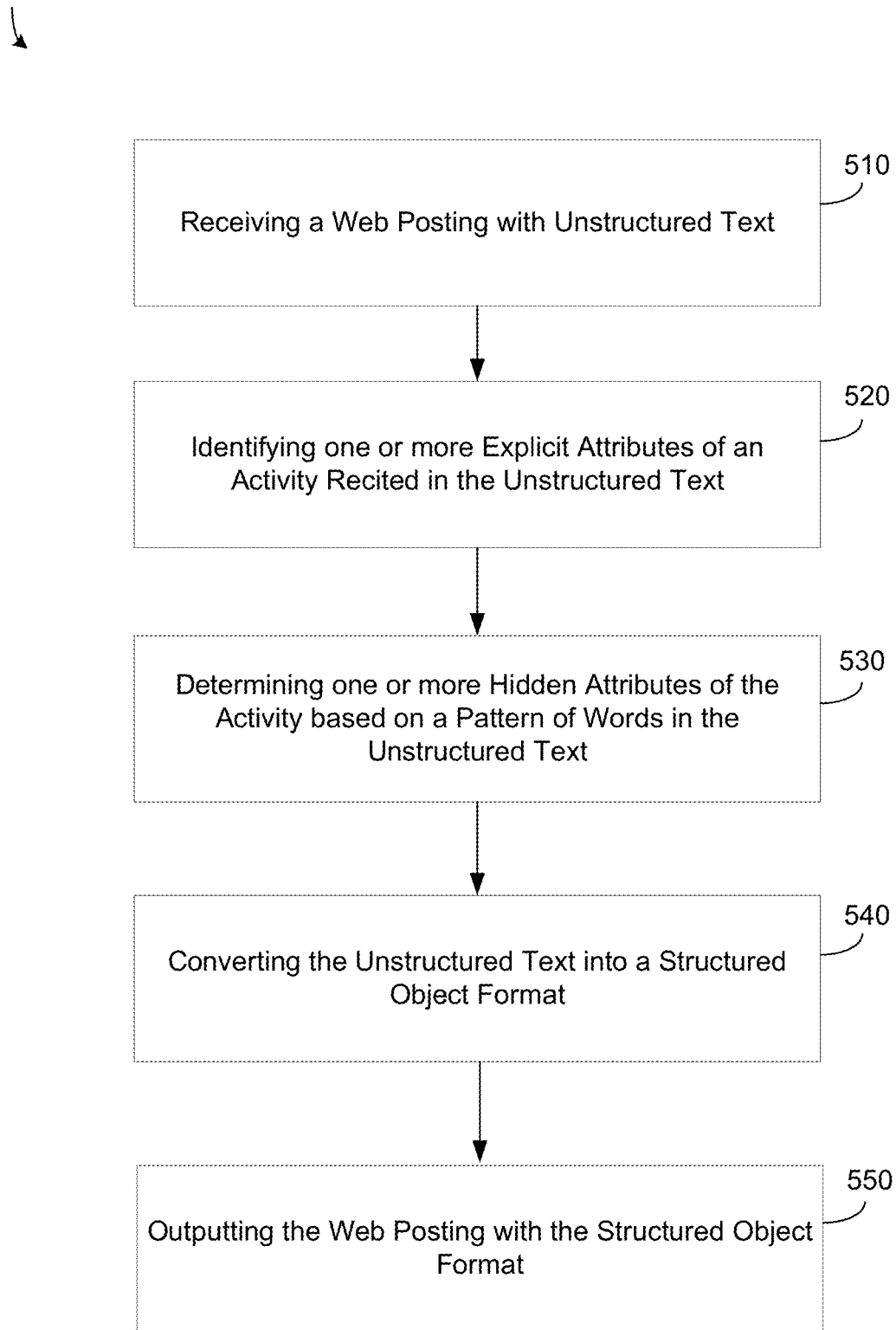
FIG. 5 is a diagram illustrating a method of transforming an unstructured web listing into a structured web listing in accordance with an example embodiment.

FIG. 5 illustrates a method 500 of transforming an unstructured web listing into a structured web listing in accordance with an example embodiment. For example, the method 500 may be performed by a computing device or a group of computing devices, such as a user device, a web server, a host platform, a cloud computing environment, and the like. Referring to FIG. 5, in 510, the method may include receiving a web listing such as a job posting or other opportunity capable of earning income and having an unstructured text object such as a string of alphanumeric characters. For example, the unstructured text may include a field or object of text which does not include or which is not fully structured. The unstructured text may include a string of words, characters, numbers, and the like, without specific fields, tables, columns, rows, or the like. In some embodiments, the unstructured data object may include a web posting that includes user generated content which is posted to a website.

In 520, the method may include identifying one or more explicit attributes of an activity (e.g., job, task, work, etc.) based on text expressly recited within the unstructured text. For example, the identifying may include classifying the web posting as a posting for a particular job opportunity, employment opportunity, work opportunity, task, program, course, training, activity, or the like, associated with an opportunity to perform a task of some kind and receive compensation. The job opportunity may be an activity such as labor, cleaning, painting, building, teaching, driving, delivering, manufacturing, educating, protecting, and the like. The job opportunity may be expressly listed within the unstructured data of the web posting or it may be determined implicitly based on other text within the unstructured data. The explicit attributes may be detected from keywords such as an activity to be performed (e.g., washing a boat, painting, driving, delivering, etc.) which are included within the text. Other examples of explicit attributes include any of the attributes shown and described with respect to FIG. 2.

In 530, the method may include determining one or more hidden attributes of the web posting not recited within the unstructured text based on a pattern of words within the unstructured text. For example, the implicit attributes may be attributes that are derived from the unstructured text based on machine learning from historical data. Here, the determining may include determining an additional text-based attribute associated with the web listing that is not expressly included or listed in the text of the unstructured data object based on the text of the unstructured data object and the identified type of event. As a non-limiting example, the text may recite, "replacing a motor on an F-350 pickup." In response, the system may determine that a tool belt may be needed, as well as automotive/mechanic training which are not recited in the posting.

In some embodiments, the determining may include determining one or more resources (e.g., tools, automobile, kitchen knives, towels, equipment, computers, etc.) needed to perform an activity associated with the web listing. In some embodiments, the determining may include determining a growth potential (e.g., will this help me get another job opportunity, etc.) of an activity associated with the web listing. The growth potential may be a score or other value. In some embodiments, the determining may include determining a training (certification, skill, education, work history, etc.) that is needed for performing or otherwise applying to an activity associated with the web listing. In some embodiments, the method may include determining whether the web listing is fake based on text of the unstructured data object.

In 540, the method may include converting the unstructured text into a structured object format which includes the one or more determined hidden attributes and one or more explicit attributes of the web posting, and in 550, the method may include outputting the web posting where the text is included in the structured object format for display via a user interface. For example, the output structured format may include fields, tables, rows, columns, or the like, of data organized into a common format such as a list, a table, a file, a sheet, an index, or the like. The structured format may be used to present a convenient screen shot of the relevant details to a user. As another example, the structured format may be stored and aggregated with other web postings which have been similarly converted into a structured format to analyze the web postings as an aggregate. For example, data from structured objects generated from multiple web postings may be extracted and analyzed to provide a user with job opportunity information of similar users, previous users who have worked for an organization, compensation information, statistics and other facts about how much a user must work to make a predefined amount of income, or the like.

Figure 6:
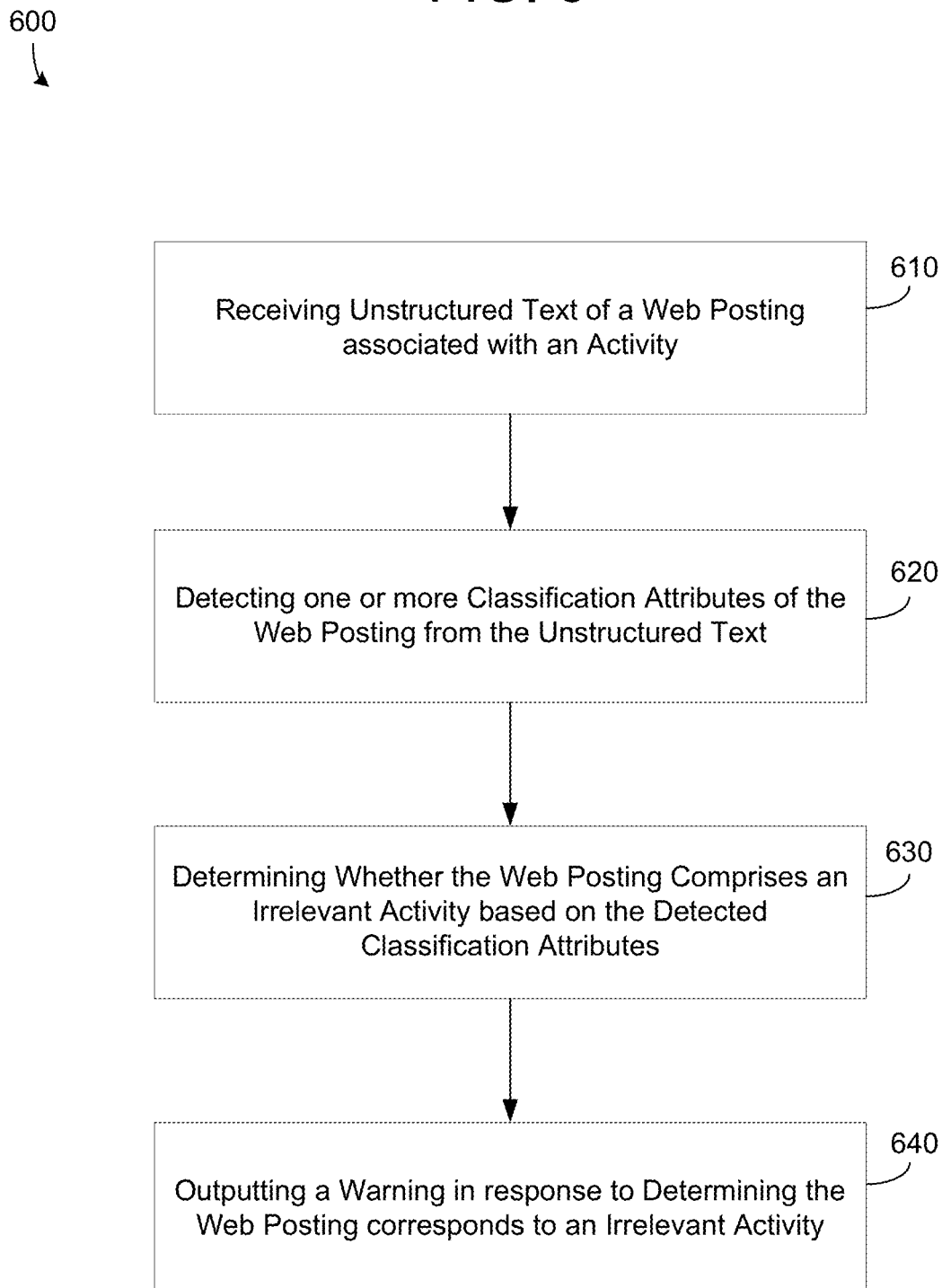
FIG. 6 is a diagram illustrating a method of detecting an irrelevant web listing in accordance with an example embodiment.

FIG. 6 illustrates a method of detecting a fraudulent web listing in accordance with an example embodiment. For example, the method 600 may be performed by a computing device or a group of computing devices, such as a user device, a web server, a host platform, a cloud computing environment, and the like. Referring to FIG. 6, in 610, the method may include receiving an unstructured data object that has text included in a web posting. For example, the unstructured data object may include a string of alphanumeric characters such as letters, words, numbers, symbols, and the like without any particular format or structure. As one example, the web posting may include a job posting in which the content of the unstructured data object comprises user generated content that is added by a user to a website for requesting applicants for an employment opportunity.

In 620, the method may include identifying one or more predefined classification attributes of the web posting based on the text within the unstructured data object. The classification attributes may include words, numbers, characters, symbols, or the like, which are based on machine learning from historical job posting data. The classification attributes may be used to help classify whether the web posting is a fake web posting or a real web posting. In some embodiments, the predefined classification attributes include one or more keywords associated with the web posting within the unstructured data object. Keywords may include job details, business names, work descriptions, or the like.

In some embodiments, the predefined classification attributes may include an alphanumeric value of a telephone number associated with the web posting listed within the unstructured data object. The telephone number may be used to determine if it is a duplicate with a telephone number included in another web posting (i.e., a duplicate) which can indicate a fraud. In some embodiments, the predefined classification attributes may include an alphanumeric value of a compensation associated with the web posting listed within the unstructured data object. If the compensation is significantly greater than it's supposed to be for a type of job, the job posting may be a scam. In some embodiments, the predefined classification attributes may include an alphanumeric value for a telephone number, a text-value for a geographic location, and a name of an entity that posted the web listing. In some embodiments, the predefined classification attributes may include a description of a job activity to be performed in association with the web posting.

In 630, the method may include determining whether the web posting is a fraudulent web posting based on the one or more identified predefined classification attributes. If the web posting is not determined to be fraudulent then the web posting may be provided as a search result or stored in a group of web postings for further analysis. However, if the web posting is determined to be fraudulent, in 640, the method may include flagging the web posting as a scam within a storage in response to determining the web posting is fraudulent. The flag may be set within a database storing content of the web posting. In some embodiments, the method may further include removing the web posting from among an aggregate of web postings in response to determining that the web posting is fraudulent. In some embodiments, the method may further include blocking access of a user that posted the fraudulent web posting.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
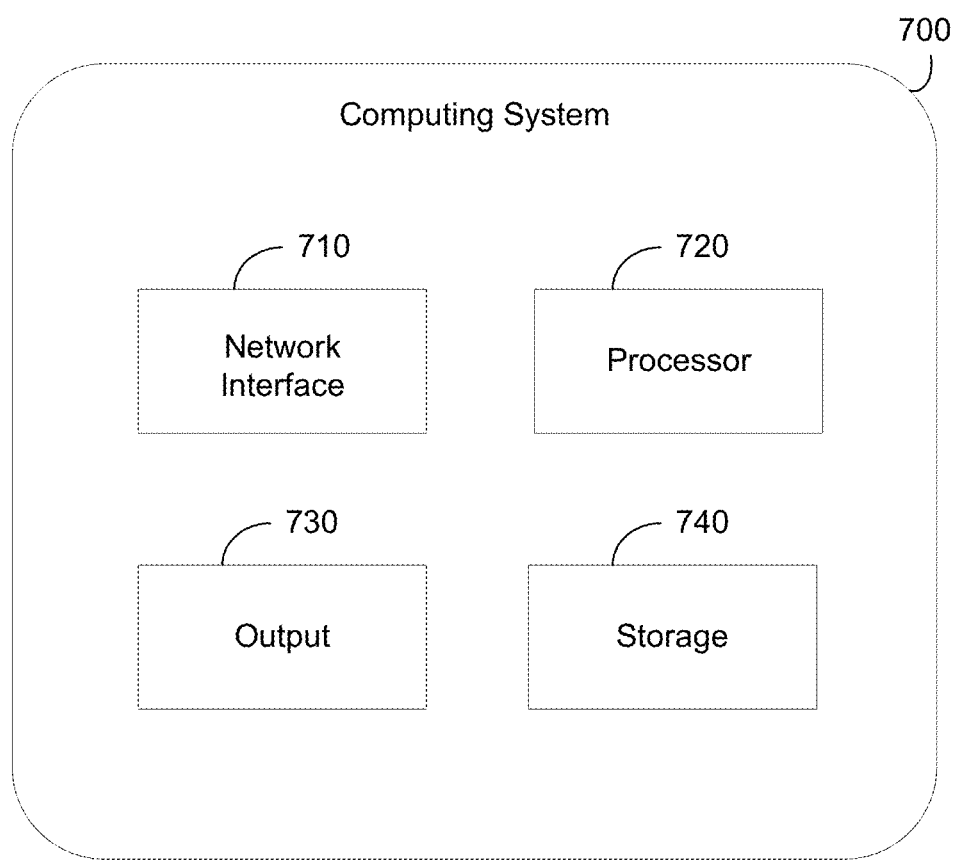
FIG. 7 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 7 illustrates an example computing system 700 which may represent or be integrated in any of the above-described components, etc. FIG. 7 is not intended to suggest any limitation as to the scope of use or functionality of embodiments described herein. The computing system 700 is capable of being implemented and/or performing any of the functionality set forth hereinabove.

The computing system 700 may include a computer system/server, which is operational with numerous other general purpose or special purpose computing system environments or configurations. Examples of well-known computing systems, environments, and/or configurations that may be suitable for use as computing system 700 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 700 may be a tokenization platform, server, CPU, or the like.

The computing system 700 may be described in the general context of computer system-executable instructions, such as program modules, being executed by a computer system. Generally, program modules may include routines, programs, objects, components, logic, data structures, and so on that perform particular tasks or implement particular abstract data types. The computing system 700 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 7, the computing system 700 is shown in the form of a general-purpose computing device. The components of computing system 700 may include, but are not limited to, a network interface 710, one or more processors or processing units 720, an output 730 which may include a port, an interface, etc., or other hardware, for outputting a data signal to another device such as a display, a printer, etc., and a storage device 740 which may include a system memory, or the like. Although not shown, the computing system 700 may also include a system bus that couples various system components including system memory to the processor 720.

The storage 740 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 740 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 740 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 700 may also communicate with one or more external devices such as a keyboard, a pointing device, a display, etc.; one or more devices that enable a user to interact with computer system/server; and/or any devices (e.g., network card, modem, etc.) that enable computing system 700 to communicate with one or more other computing devices. Such communication can occur via I/O interfaces. Still yet, computing system 700 can communicate with one or more networks such as a local area network (LAN), a general wide area network (WAN), and/or a public network (e.g., the Internet) via network interface 710. As depicted, network interface 710 may also include a network adapter that communicates with the other components of computing system 700 via a bus. Although not shown, other hardware and/or software components could be used in conjunction with the computing system 700. Examples include, but are not limited to: microcode, device drivers, redundant processing units, external disk drive arrays, RAID systems, tape drives, and data archival storage systems, etc.

According to various embodiments, the network interface 710 may receive an unstructured data object comprising text associated with a web posting. The unstructured data object may be a web posting such as a job opportunity. The processor 720 may identify a type of event (e.g., job, position, etc.) associated with the web posting from among a plurality of possible types of events based on text included in the unstructured data object. The processor 720 may determine one or more implicit attributes of the web posting not explicitly described within the text based on the identified type of event and the text included in the unstructured data object, and generate a structured data object which includes the one or more determined implicit attributes and one or more explicit attributes of the web posting. Furthermore, the processor 720 may output the structured data object for display via a user interface. As another alternative example, the unstructured data object may be stored and analyzed with an aggregate of web postings which have been converted into unstructured data objects to analyze information about a group of job opportunities, workers, compensation amounts, skills, and the like.

As another example embodiment, the network interface 710 may receive an unstructured data object of text included in a web posting. In this example, the processor 720 may identify one or more predefined classification attributes of the web posting based on the text within the unstructured data object. Furthermore, the processor 720 may determine whether the web posting is a fraudulent web posting based on the one or more identified predefined classification attributes, and flag the web posting as a scam within a storage in response to determining the web posting is fraudulent.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:
1. A computing system comprising:
a memory configured to store unstructured text of a plurality of web postings; and
a processor configured to:
read a string of unstructured text of a web posting, transform the string of unstructured text into a structured display object that comprises a normalized list of fields for attribute values,
identify an attribute value that is expressly recited in the web posting and fill-in a first field of the normalized list of fields with the identified attribute value;
execute a machine learning model on the string of unstructured text from the web posting to infer a second attribute value from the web posting that is not expressly recited in the web posting based on a pattern of words included in the string of unstructured text of the web posting and fill-in a second field of the normalized list of fields with the second attribute value inferred by the machine learning model, and
display the structured display object via a display device including the identified attribute value and the inferred second attribute value filled-in first and second fields, respectively.

2. The computing system of claim 1, wherein the processor is configured to display names of the attribute types next to the common normalized list of fields.

3. The computing system of claim 1, wherein the machine learning model is configured to infer the second attribute value based on one or more attribute values that are expressly recited in the string of unstructured text.

4. The computing system of claim 1, wherein the processor is further configured to store content of attribute values included in the normalized list of fields of the structured display object in a JavaScript Object Notation (JSON) object.

5. The computing system of claim 4, wherein the processor is further configured to determine an identifier of the web posting and store the identifier of the web posting in the JSON object.

6. The computing system of claim 1, wherein the processor is further configured to convert the structured display object into a normalized web posting and display the normalized web posting via a website.

7. A method comprising:
storing unstructured text of a plurality of web postings;
reading a string of unstructured text of a web posting;
transforming the string of unstructured text into a structured display object that comprises a common normalized list of fields for attribute values;
identifying an attribute value that is expressly recited in the web posting and filling-in a first field of the normalized list of fields with the identified attribute value;
executing a machine learning model on the string of unstructured text from the web posting to infer a second attribute value from the web posting that is not expressly recited in the web posting based on a pattern of words included in the string of unstructured text of the web posting and filling-in a second field of the normalized list of fields with the second attribute value inferred by the machine learning model; and
displaying the structured display object via a display device including the identified attribute value and the inferred second attribute value filled-in first and second fields, respectively.

8. The method of claim 7, wherein the method further comprises displaying names of the attribute types next to the common normalized list of fields.

9. The method of claim 7, wherein the machine learning model is configured to infer the second attribute value based on one or more other attribute values that are expressly recited in the string of unstructured text.

10. The method of claim 7, wherein the method further comprises storing content of attribute values included in the normalized list of fields of the structured display object in a JavaScript Object Notation (JSON) object.

11. The method of claim 10, wherein the method further comprises determining an identifier of the web posting and storing the identifier of the web posting in the JSON object.

12. The method of claim 7, wherein the method further comprises converting the structured display object into a normalized web posting and displaying the normalized web posting via a website.

13. A non-transitory computer-readable medium comprising instructions which when executed by a processor cause a computer to perform a method comprising:
storing unstructured text of a plurality of web postings via a computing system;
reading a string of unstructured text of a web posting;
transforming the string of unstructured text into a structured display object that comprises a common normalized list of fields for attribute values;
identifying an attribute value that is expressly recited in the web posting and filling-in a first field of the normalized list of fields with the identified attribute value;
executing a machine learning model on the string of unstructured text from the first web posting to infer a second attribute value from the web posting that is not expressly recited in the web posting based on a pattern of words included in the string of unstructured text of the web posting and filling-in a second field of the list of fields with the second attribute value inferred by the machine learning model; and
displaying the structured display object via a display device including the identified attribute value and the inferred second attribute value filled-in first and second fields, respectively.

14. The non-transitory computer-readable medium of claim 13, wherein the method further comprises displaying names of the attribute types next to the common normalized list of fields.

15. The non-transitory computer-readable medium of claim 13, wherein the machine learning model is configured to infer the second attribute value based on one or more other attribute values that are expressly recited in the string of unstructured text.

16. The non-transitory computer-readable medium of claim 13, wherein the method further comprises storing content of attribute values included in the normalized list of fields of the structured display object in a JavaScript Object Notation (JSON) object.

17. The non-transitory computer-readable medium of claim 13, wherein the method further comprises converting the structured display object into a normalized web posting and displaying the normalized web posting via a website.

* * * * *